Patented Jan. 16, 1923.

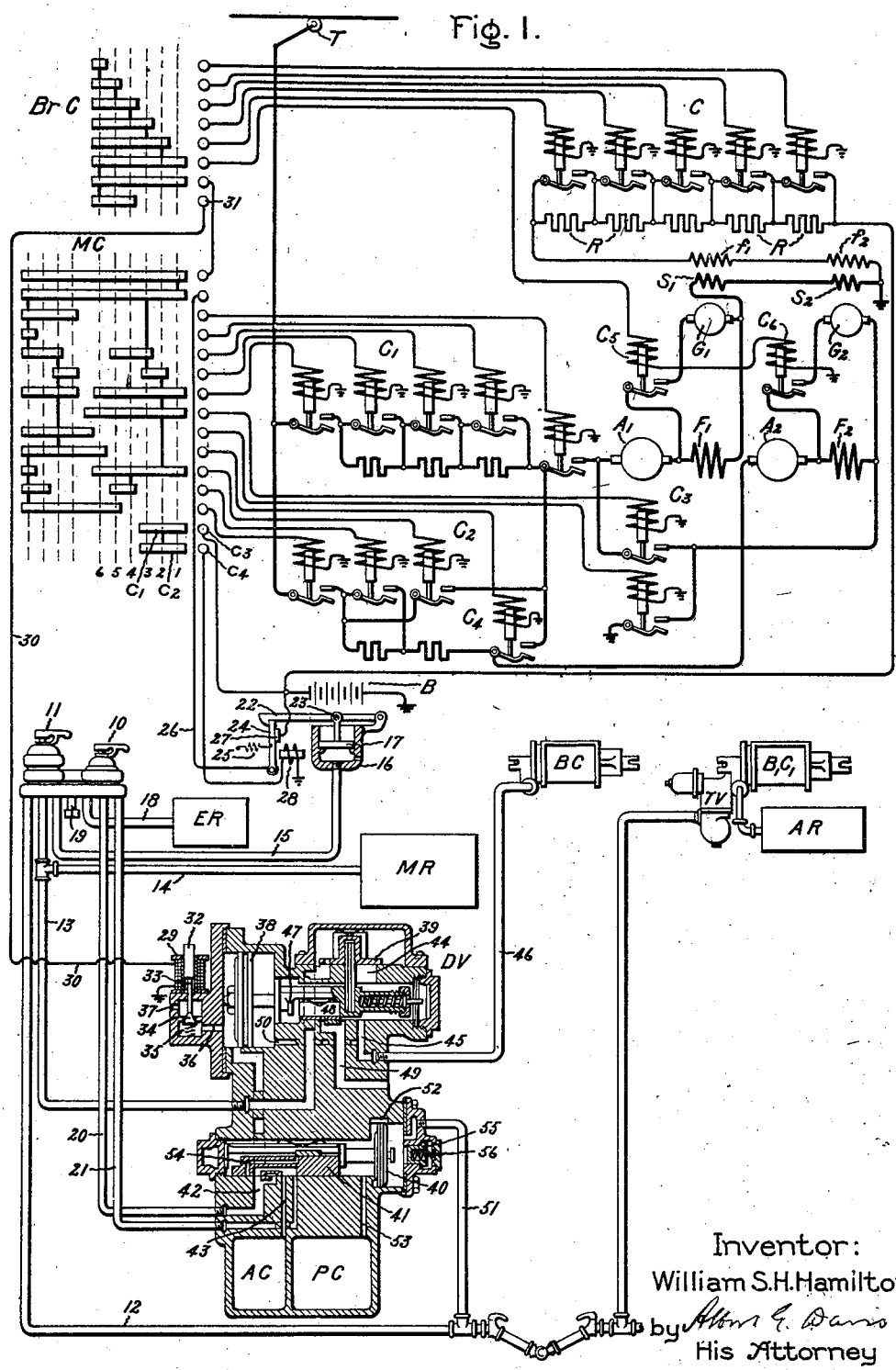

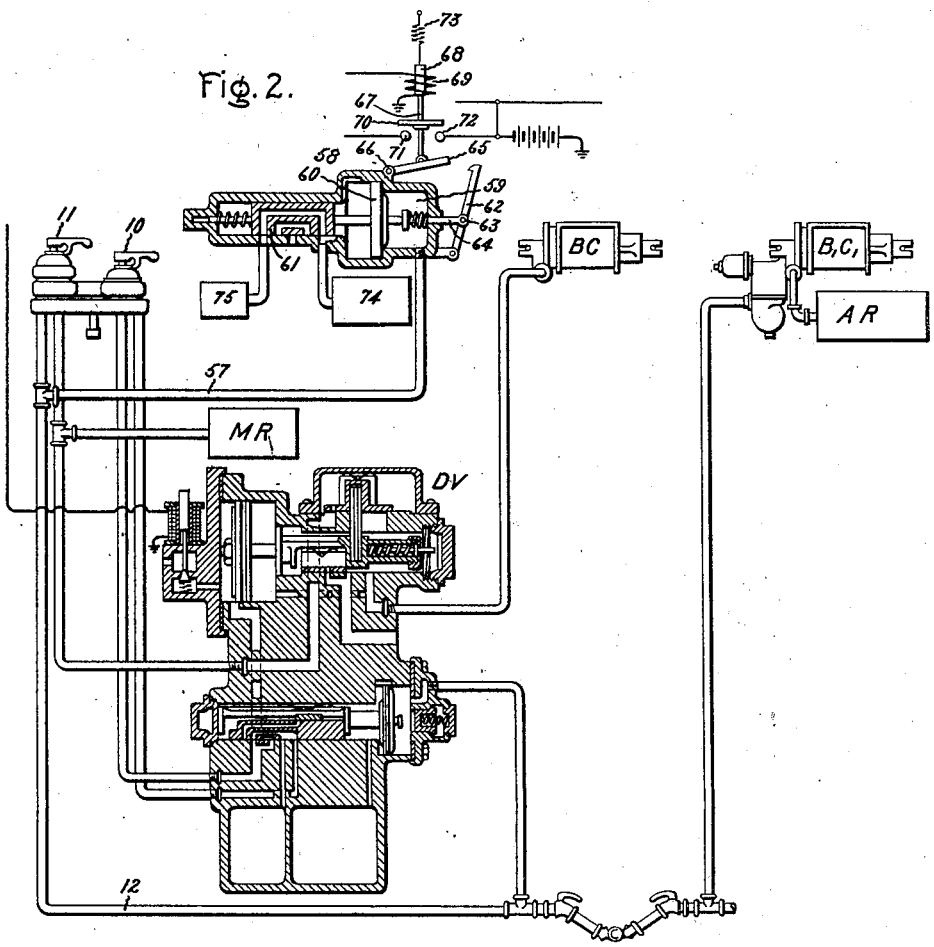

1,442,269

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

BRAKING SYSTEM.

Application filed March 25, 1918. Serial No. 224,575.

*To all whom it may concern:*

Be it known that I, WILLIAM S. H. HAMILTON, a citizen of the United States, residing at Schenectady, in the county of Schenectady, State of New York, have invented certain new and useful Improvements in Braking Systems, of which the following is a specification.

My invention relates to the braking of a train unit, such as an electric locomotive, and has for its object the provision of an improved device of this character.

Considerations of efficiency, reliability and convenience sometimes require that a train unit, such as an electric locomotive, be provided with both an electric braking system, such as a regenerative brake, and with an air brake, so arranged that either of these brakes may be used independently. At the same time it is generally inadvisable that both brakes be used simultaneously as this may result in the slipping of the wheels and in general produces an unsatisfactory braking effect.

In accordance with my invention, a train unit is equipped with both an electric brake, which may, for example, be a regenerative braking system, and with an air brake of any well known type and while either of the brakes may be freely operated, my invention provides for improving the braking effect obtained by the two systems by so interlocking the two brakes that in general, both brakes may not be applied simultaneously.

Briefly it may be stated that the following results are obtained in accordance with my invention.

An application of the electric braking renders the air brakes on the locomotive inoperative so far as service application is concerned. In case a service application of the air brakes has been made, then if the electric braking is applied, the air brakes on the locomotive are released but remain applied on the remainder of the train. In case the electric brakes are first applied, it is impossible to make a service application of the air brakes on the locomotive, though they may be applied on the remainder of the train.

My invention also provides means for rendering the electric brakes incapable of operation when an emergency application of the air brakes has been made, particularly if it has been made in response to an act of the train operator as, for example, by throwing the engineer's valve to the emergency position. One way in which this may be done is that illustrated in the drawing, where a port, with which the engineer's valve is commonly provided for applying sand to the tracks, is used for conducting air from a source of fluid pressure to a pneumatically operated device which renders the electric braking system inoperative.

My invention will best be understood by reference to the accompanying drawings, in which Fig. 1 shows somewhat diagrammatically my invention applied to a train unit, such as an electric locomotive, and a train drawn thereby; Fig. 2 shows a modified form of my invention and Fig. 3 shows the automatic brake valve diagrammatically developed, but for the sake of simplicity, illustrating only the essential features of my invention.

Referring now to the drawings and first to Fig. 1, $A_1$ and $A_2$ are the car motors of any well known type with which the train unit is provided, having series fields $F_1$ and $F_2$. Exciter generators $G_1$ and $G_2$ are provided for exciting the fields $F_1$ and $F_2$ of the motors during regenerative braking. These generators are provided with series fields $S_1$ and $S_2$ and with shunt fields $f_1$ and $f_2$, the latter being connected to a source of energy B, such for instance, as a storage battery. The strength of the shunt fields $f_1$ and $f_2$ is varied by means of a series of resistances R which are controlled by a series of contactors C which are in turn controlled from the electric braking controller BrC in a well known manner, being successively cut out as the braking controller is turned in the braking direction. The car is provided with the usual master controller MC for controlling the circuits of the motors in the usual manner through contactors $C_1$, $C_2$, $C_3$ and $C_4$ in a manner which is well understood. Two contactors $C_5$ and $C_6$ are provided for closing the circuits of the armatures of the exciter generators $G_1$ and $G_2$ when the braking controller is turned to the braking position. In addition to the usual contacts with which the master controller is provided, two special contacts $c_1$ and $c_2$ are provided co-operating with two stationary contacts $c_3$ and $c_4$ for again closing the main control circuit as will be more fully hereinafter explained. The car motors are connected to the usual trolley T.

The air braking system, which I have here illustrated, comprises a distributing valve DV of a well known type, with which are associated the engineer's independent valve 10 for applying the air brakes on the locomotive or other train unit, but not on the remainder of the train, and an automatic valve 11 for applying the brakes on the entire train. The brake pipe 12 is connected to the automatic valve, as is a pipe 13, which is connected to the distributing valve. The main reservoir is connected to the pipe 13 through a pipe 14. It will be understood that constant pressure is maintained in the main reservoir by a compressor, (not shown in the drawings). A pipe 15 is connected to a port in the automatic valve which is commonly used for applying sand to the track when the automatic valve has been moved to the emergency position. This pipe is connected to a cylinder 16 provided with a piston 17. When the automatic valve is moved to the emergency position, the pipe 15 is connected through the automatic valve to the main reservoir as diagrammatically indicated in Fig. 3, and fluid pressure is supplied from the main reservoir to the cylinder 16 and actuates a piston 17 for a purpose which will be hereinafter more fully described. The equalizing reservoir ER communicates with the space above the equalizing piston in the usual manner and a pipe 19 is connected to atmosphere. The application cylinder pipe 20 and the distributing valve-release pipe 21 connect the independent brake valve 10 to the distributing valve. A latch arm 22 is pivoted at 23 to the piston 17 of the cylinder 16. Normally the latch 22 engages a contact arm 24 and holds the same against a stationary contact 27 which is connected to the battery B. The arm 24 is biased outwardly by a spring 25. To the arm 24 is connected the main control circuit 26. A reset magnet 28 is provided for returning the arm 24 to the position shown in Fig. 1 and this is connected to a special contact $c_4$ and when the master controller is turned to the first notch, the magnet 28 is energized through a circuit which includes the battery B, the contacts $c_1$, $c_2$, $c_3$ and $c_4$ and the magnet 28, to return the arm 24 to the position shown in Fig. 1, where it is held by the latch 22.

In the form of my invention here illustrated, a magnet 29 is mounted on the cap of the application chamber of the distributing valve and is connected, by a conductor 30, to a contact 31 which is engaged by a contact on the braking controller when the latter is moved to the fourth position.

The magnet 29 is provided with an armature 32 connected by a stem 33 to a valve 34 which is normally closed by a spring 35. An opening is provided in the cap of the application cylinder of the distributing valve which connects the front of the application piston with the space beneath the valve 34. The space above the valve 34 communicates with the atmosphere through a passage 37. Under normal conditions the valve 34 cuts off communication between the passage 36 communicating with the front of the application piston and the exhaust passage 37 but when the magnet 29 is energized, the valve 34 is opened and communication established between said cylinder and the atmosphere.

The distributing valve is provided with an application chamber AC and a pressure chamber PC, an application piston 38, application valve 39 and an equalizing piston 40 which actuates an equalizing valve 41 in the usual manner. It is believed that the various ports and passages of the distributing valve can best be described in connection with the operation of the device and such description will, therefore, be given in connection with the description of the operation.

The operation of the electric braking system, which is most commonly used when the train unit is proceeding on a down grade, is simple and will readily be understood from the foregoing description. In order to apply the regenerative braking, the braking controller is moved to the right, as shown in Fig. 1, when the contactors $C_5$ and $C_6$ will be energized and the circuits of the armatures of the exciter generators $G_1$ and $G_2$ are closed, forming a shunt around the series fields $F_1$ and $F_2$ of the motors. Under these conditions the series fields of the motors are excited beyond the normal excitation by currents in the same direction as the normal field current, and developing in the motor a counter electromotive force sufficient to return energy to the line.

In order to make an independent slow application of the air brakes on the locomotive or other train unit independently of the rest of the train, the independent valve is turned to the slow application position and the main reservoir is connected through the automatic and the independent valves to the application pipe 20 and passage 42 in the distributing valve, to the chamber in front of the application piston 38 and through a passage 43 with the application chamber AC. The piston 38 is thereby moved to the right and with it the application valve 39, thereby uncovering the opening 44 and establishing communication from the main reservoir through the pipes 13 and 14, to the space above the application valve 39, through the opening 44, passage 45 and pipe 46 to the brake cylinder BC, thus applying the air brakes on the locomotive or other unit, only. At the same time the exhaust valve 48 is moved to the right to lap the exhaust passage 49 and close communication from the brake cylinder to the atmosphere. The air continues to flow from the main reservoir into the brake cylinder until the pressure therein exceeds that on the application side of the piston 38 when the latter will be moved somewhat to the left, thereby closing communication between the brake cylinder and the main reservoir. The stem of the application piston 38 is provided with a lug 47 which provides lost motion between the application piston and the exhaust valve 48 so that the movement of the application piston, which takes place at this time, does not disturb the position of the exhaust valve. A passage 50 in the distributing valve connects the chamber at the back of the application piston 38 with the passage 45 which communicates with the pipe 46 leading to the brake cylinder. This is for the usual purpose of maintaining pressure in the brake cylinder. If leakage occurs in the brake cylinder or the parts connected thereto, the reduction of pressure resulting therefrom will cause the application piston 38 to be moved to the right due to the pressure in the application cylinder and air will again be admitted to the brake cylinder from the main reservoir as before. It is, of course, to be understood that when a slow application of the independent brake valve is made, the main reservoir is connected to the distributing valve through an opening in the independent valve which is somewhat restricted and that a quick application is made by moving the independent valve to the quick application position when a larger opening in the independent brake valve furnishes communication between the main reservoir and the chamber to the left of the piston 38, and the locomotive brake will thus be applied more quickly than before. The brake cylinder on the locomotive, or other train unit, which alone has been operated in response to the movement of the independent valve is released in the usual manner.

A pipe 51 connects the brake pipe 12 to the chamber in the distributing valve in front of the equalizing piston 40, and when the normal brake pipe pressure is present in the pipe, the piston 40 is moved to the position at the left as shown in Fig. 1, and air passes around the piston through the feed groove 52 and passage 53 to the pressure chamber PC. Now, if it is desired to make a service application of the brakes on the train, the automatic valve 11 is moved to the service application position and the pressure in the brake pipe thereby reduced. This causes the equalizing piston 40, and with it the equalizing valve 41, to be moved to the right thereby bringing the port 54 in the equalizing valve into communication with the passage 42, and air flows from the pressure chamber PC through the passage 53 to the space above the equalizing valve 41 through the port 54 to the passage 42 and to the chamber at the left of the application piston 38. The application piston is thereby moved to the right and air admitted from the main reservoir to the brake cylinder in the same manner as described in connection with the independent application of the air brakes of the locomotive. Again pressure will be maintained in the brake cylinder, notwithstanding leakage, by reason of the passage 50 which connects the pipe 46, leading to the brake cylinder, with the application chamber at the right of the piston 38. It will, of course, be understood that the brakes on the train unit shown at the right in Fig. 1 and on any other units to which the automatic brakes are connected, will be applied in the usual manner; that is, the operation of the triple valve TV will cause air to pass from the auxiliary reservoir AR to the brake cylinder $B_1$—$C_1$. When the brake pipe is again charged to release the brakes, the equalizing piston 40 will be moved to the left as shown in Fig. 1 and the pressure in the pressure cylinder will again be built up to brake pipe pressure.

The operation of the braking controller BrC renders the air brakes on the locomotive, or other train unit, on which the electric braking takes place, inoperative. If a service application of the air brakes on the locomotive has been made either through the movement of the independent valve or by the automatic valve as hitherto described, the movement of the braking controller to the braking position, or as here shown, to the fourth notch of the braking position, will close a circuit from the battery B through the contact 27, armature 24, conductor 26, master controller MC, braking controller, contact 31, conductor 30 through the magnet 29 thereby energizing the latter and opening the valve 34 and exhausting the air from the application cylinder to the atmosphere. The piston will thereby be moved to the left to the position shown in Fig. 1 thereby closing communication between the main reservoir and the brake cylinder and opening the passage from the brake cylinder to the atmosphere. Similarly, if the electric brakes are first applied and an attempt is then made to make a service application of the air brakes of the locomotive, air will be exhausted from the left of the piston 38 to atmosphere as before and it will, therefore, be impossible to move the application piston to the right as required to make an application of the brakes on the locomotive, or other train unit.

Now, it is sometimes desirable to make an emergency application of the air brakes on the entire train regardless of the electric brakes on the locomotive, and in order to enable the train operator to bring about this result, means are provided for rendering the electric brakes inoperative which preferably also cut out the motors themselves when such emergency application of the air brakes is made. When the automatic valve is moved to the emergency position, the latch 22 is moved upwardly in the manner previously described, to release the armature 24, thereby opening the main control circuit and thereby making it impossible to apply the electric brakes. In the preferred form of my invention, the motors are also cut out as here illustrated. The cylinder 16 is preferably provided with a blow hole as shown to relieve the pressure in the cylinder after the emergency application has been made in order to permit the piston 17 and the parts associated therewith to return to the normal position shown in the drawing. It is to be observed, however, that this result follows only from the voluntary act of the train operator. In general it is undesirable to have the electric braking made inoperative in response to a break in the brake pipe. Such breaks are of rather frequent occurrence particularly in connection with freight train operation and it is not desirable to have the electric braking made inoperative from this cause. When the automatic brake valve has been moved to the emergency position, the pressure in the brake pipe is reduced to such an extent that the equalizing piston 40 which, in response to a service application of the air brakes is brought only into engagement with the member 55, presses this member to the right against the action of the spring 56, thereby moving the equalizing valve to the right sufficiently to open communication directly from the pressure chamber to the passage 42, thereby quickly forcing the application piston 38 to the right and bringing about an application of the brakes on the locomotive. The brakes on the other train units will be applied as usual when an emergency application has been made.

The arrangement described in connection with Fig. 1 is the preferred form of my invention since it permits of a distinction being made between an emergency application of the air brakes in response to the act of the train operator and one made in response to a break in the brake pipe. Under some conditions, it may be desirable to have the brakes applied on the locomotive in response to either of these conditions, and I have shown in Fig. 2 an arrangement appropriate for producing such action. I have illustrated this form of my invention in connection with a distributing valve and as it is exactly like the one described in connection with Fig. 1, a description of the same will not be repeated. An independent brake valve 10 and an automatic valve 11 are also provided which are connected to the distributing valve, to the brake pipe, and to the main reservoir in precisely the same manner as that described in connection with Fig. 1. In this form of my invention, a pipe 57 is connected to the brake pipe 12 and communicated with a valve 58 resembling somewhat a triple valve. The pipe 57 communicates with the chamber 59 in front of the piston 60 in the valve 58. A slide valve 61 is provided in the valve 58 for establishing communication between a cylinder 74 and a smaller cylinder 75 or from the cylinder 75 to the atmosphere in a manner somewhat analogous to the operation of a triple valve. When the brake pipe is charged to its normal pressure, the piston 60 is moved to the left, away from the position shown in Fig. 2. A latch 62 is pivoted at 63 to a stem 64 which is engaged by the piston 60. An arm 65 which is pivoted at 66 on the valve casing, is pivoted to a stem 67 provided with a core 68 which cooperates with the magnet 69 and also provided with a bridging contact 70 which cooperates with two stationary contacts 71 and 72. The stem 67 is retracted by a spring 73. Normally the arm 65 is held downwardly by the latch 62, thereby maintaining the bridging contact 70 in engagement with the stationary contacts 71 and 72 and maintaining the main control circuit of the electric locomotive closed. The valve 58 is so designed that the piston 60 will be moved to the right sufficiently to disengage the latch 62 only in response to an emergency application of the brakes, and in this case, of course, the valve will be operated when such emergency application results either from the act of the train operator or from a break in the brake pipe.

The purpose of reservoir 75 is to reduce the pressure in reservoir 74 to a desired amount. Piston 60 is shown in extreme right position after an emergency application. Under ordinary service application conditions the piston will not move far enough to the right to disengage latch 62. When pressure is applied to release the brakes, piston 60 will be moved to the extreme left position, and moving with it slide valve 61 against spring pressure. Air will now flow from chamber 59 past piston 60 through leakage grooves to reservoir 74 until the reservoir pressure is equal to the brake pipe pressure. Reservoir 75 will exhaust through valve 61. If the brake pipe pressure is reduced slowly, as in service application, piston 60 will be moved a short distance to the right by the pressure in reservoid 74 until stopped by stem 64, closing the leakage grooves and connecting reservoir 74 to reservoir 75 through valve 61, so that the pressure in the reservoirs will equalize. If the brake pipe reduction is not sufficient to cause a full service application, the piston will be moved slightly to the left until stopped by spring pressure, so that the pressure in the reservoir 74 is reduced below the brake pipe pressure. In emergency application the heavy reduction of brake pipe pressure permits the air pressure in reservoir 74 to move piston 60 to the right with sufficient force to release the latch. The action of this valve is practically identical with the action of valve 41.

The diagrammatic representation in Fig. 3, showing a development of the automatic valve in Fig. 1, will, it is believed, be understood without further description.

While I have described my invention as embodying a concrete structure and as operating in a specified manner in accordance with the provisions of the patent statutes, it should be understood that I do not limit my invention thereto, since various modifications will suggest themselves to those skilled in the art without departing from the spirit of my invention. For instance, I have shown the valve magnet 29 so connected to the braking controller that it will be operated only when the controller has been moved to the fourth position. I prefer this arrangement for the reason that it is sometimes desirable to apply the air brakes when the electric brakes are exercising only a small braking effect as is the case when the braking controller has not been moved further than the third position. It will, of course, be understood that the contact on the braking controller may readily be arranged to cause the air brakes to become inoperative at various positions of the braking controller, and indeed, the contact may be extended across the braking controller so that the air brakes are inoperative as soon as the electric brakes are applied and remain inoperative during the time that they are so applied.

What I claim as new and desire to secure by Letters Patent of the United States, is:—

1. The combination with means for applying air brakes to a railway train unit and means for applying electric braking to the same unit, the two braking means being each normally separately operable, of connections between the two brakes permitting the simultaneous application of a predetermined value of braking by the brakes and for preventing the simultaneous application of a greater value of braking by the two brakes.

2. The combination with means for applying air brakes to a railway train unit and means for applying electric braking to the same unit, the two braking means being each normally separately operable, of connections between the two brakes for permitting the simultaneous application of a predetermined value of braking by the two brakes, for releasing the air brakes when the electric braking effect is increased, and for preventing the simultaneous application of the electric braking and an emergency application of the air brakes.

3. The combination with means for applying air brakes to a railway train unit and means for applying electric braking to the same unit, the two braking means being each normally separately operable, of a controller for governing the electric braking, engineer's valve mechanism for controlling the air brakes, connections between the two brakes permitting the simultaneous application of a predetermined value of braking by the two brakes under the control of the said controller and the said engineer's valve mechanism, and for releasing the air brakes when the said controller is operated to increase the electric braking and means responsive to an emergency application of the air brakes for rendering the electric braking inoperative.

4. The combination with means for applying air brakes to a railway train unit and means for applying electric braking to the same unit, the two braking means being each normally separately operable, of connections between the two brakes for permitting the simultaneous application of a predetermined value of braking by the two brakes and for releasing the air brakes when the electric braking effect is increased, and means under the control of the train operator for making an emergency application of the air brakes and simultaneously rendering the electric braking inoperative.

5. The combination with means for applying air brakes to a railway train unit and means for applying electric braking to the same unit, the two braking means being each normally separately operable, of means for preventing the simultaneous application of the electric braking and a service application of the air brakes, and independent means for preventing the simultaneous application of the electric braking and an emergency application of the air brakes.

6. The combination with means for applying air brakes to a railway train unit and means for applying electric braking to the same unit, the two braking means being each normally separately operable, of means for preventing the simultaneous application of the electric braking and a service application of the air brakes, and independent means responsive to an emergency application of the air brakes for rendering the electric braking inoperative.

7. The combination with means for applying air brakes to a railway train unit and means for applying electric braking to the same unit, the two braking means being each normally separately operable, of means responsive to the application of the electric braking for rendering the air brakes inoperative so far as a service application of the air brakes is concerned, and means responsive to an emergency application of the air brakes for rendering the electric braking inoperative.

In witness whereof, I have hereunto set my hand this 22nd day of March 1918.

WILLIAM S. H. HAMILTON.